United States Patent [19]

Au et al.

[11] Patent Number: 5,266,850
[45] Date of Patent: Nov. 30, 1993

[54] CLOCK DELAY TRIM ADJUSTMENT WITH STOPPING FEATURE FOR ELIMINATING DIFFERENTIAL DELAY BETWEEN CLOCK SIGNAL AND ANALOG SIGNAL

[75] Inventors: Hoan A. Au, Palo Alto; Arvind M. Patel, San Jose; Robert A. Rutledge, San Jose; Bum S. So, San Jose; Albert S. Su, San Jose, all of Calif.

[73] Assignee: International Business Machines Corporation, Armonk, N.Y.

[21] Appl. No.: 907,766

[22] Filed: Jun. 30, 1992

[51] Int. Cl.$^5$ .............................................. H04N 5/04
[52] U.S. Cl. .................... 307/511; 307/269; 307/262; 307/261; 307/603; 328/63
[58] Field of Search ............... 307/511, 269, 262, 261, 307/603; 328/63

[56] References Cited

U.S. PATENT DOCUMENTS

| | | | |
|---|---|---|---|
| 4,030,038 | 6/1977 | Daniel et al. | 307/603 |
| 4,546,269 | 10/1985 | Johnson | 307/269 |
| 4,578,705 | 3/1986 | Elmis et al. | 328/63 |
| 4,839,726 | 6/1989 | Balopole et al. | 358/166 |
| 4,945,538 | 7/1990 | Patel | 371/43 |
| 5,087,829 | 2/1992 | Ishibashi et al. | 307/269 |

Primary Examiner—William L. Sikes
Assistant Examiner—Scott A. Ouellette
Attorney, Agent, or Firm—Henry E. Otto, Jr.

[57] ABSTRACT

Method and circuitry for phase synchronizing an analog input signal with a clock signal by sensing clock delay error, adjusting in increments clock delay trim of a delay element that initially has an arbitrary delay setting, and stopping adjustment after differential delay between the signals has been eliminated.

18 Claims, 6 Drawing Sheets

CLOCK DELAY TRIM ADJUSTMENT WITH STOPPING FEATURE FOR ELIMINATING DIFFERENTIAL DELAY BETWEEN CLOCK SIGNAL AND ANALOG SIGNAL

FIELD OF THE INVENTION

This invention relates to coded signal processing channels wherein an analog signal is converted into a series of digitized sample values representative of coded binary data, and relates more particularly to an improved method and apparatus for phase synchronizing the analog electrical input signal with a clock signal in the presence of noise, which includes sensing the clock delay error, making the clock delay trim adjustment of a delay element and stopping these adjustments after differential delay between said signals has been eliminated.

BACKGROUND OF THE INVENTION

Commonly assigned U.S. Pat. No. 4,945,538 discloses an analog-to-digital converter (ADC) that receives a clock signal from a phase-locked loop oscillator and converts the analog signal to digitized sample values at successive sample times. To eliminate phase error, differential delay between the clock signal and analog signal is removed by use of a discrete delay element, such as a digital chip of the type that permits manual setting of delays in increments as low as one tenth of nanosecond.

There is need for a method and apparatus that reliably eliminates delay due to phase error between the clock signal and analog input signal in a signal processing channel irrespective of the degree the signals are initially out of phase and despite the presence of noisy digitized sample values of the analog signal.

SUMMARY OF THE INVENTION

A method and circuitry are disclosed for adjusting the delay setting of a delay element for thereby adjusting delay of a clock signal relative to an analog input signal so that the signals will be phase synchronized and the analog signal correctly sampled by an ADC.

Assume that the delay element initially has an arbitrary delay setting. At successive clock signals the ADC converts the analog signal into a series of digitized samples subject to noise. Counter A counts the number of qualified events identified by a sample having a value exceeding a predetermined value K and not smaller than the values of both the immediately preceding and immediately following samples. Counter B generates from a series of qualified events a count cumulatively indicative of a current sign and magnitude of phase error averaged over a number of sample values sufficient to eliminate the effect of noise, since the sample values are subject to noise.

When the count in counter B reaches a preestablished threshold value ($T_2$ or $-T_2$), the delay setting is bumped up or down a preselected amount (e.g., 1 unit) and all counters are reset. Counter C counts the number of times two adjacent samples exceed said predetermined value K. Whenever counter C reaches a preselected threshold $T_3$, the delay setting is bumped a preselected greater amount (e.g. 3 units) up or down depending upon the sign of the count in counter B to insure against hunting during start up, and all counters are reset. Adjustment of the delay setting is terminated when the count in counter A reaches a preselected number $N_2$ by which time, since there has been no intervening reset, the delay setting is presumed correct. All counters are now reset.

In a preferred embodiment, counter B has four preestablished threshold values, $T_1$, $-T_1$, $T_2$ and $-T_2$, the value $T_1$ being smaller than $T_2$. In this event, the delay setting is bumped up or down the preselected amount (1 unit) when the count in the counter B reaches (a) either $-T_1$ or $T_1$, before the count in counter A exceeds $N_1$, or (b) either $-T_2$ or $T_2$ after $N_1$ is exceeded, where $N_1$ is significantly smaller than $N_2$. Again, each time the delay setting is bumped, all counters are reset.

Thus adjustment of the delay setting is rapidly accomplished by initial fact (3 unit) increments, if required by the degree of phase difference between the sample clock and the analog signal, then in slower (1 unit) increments until, without any intervening counter resets, $N_2$ consecutive positive peaks have been counted by counter A.

DESCRIPTION OF PREFERRED EMBODIMENT

Figure 1:
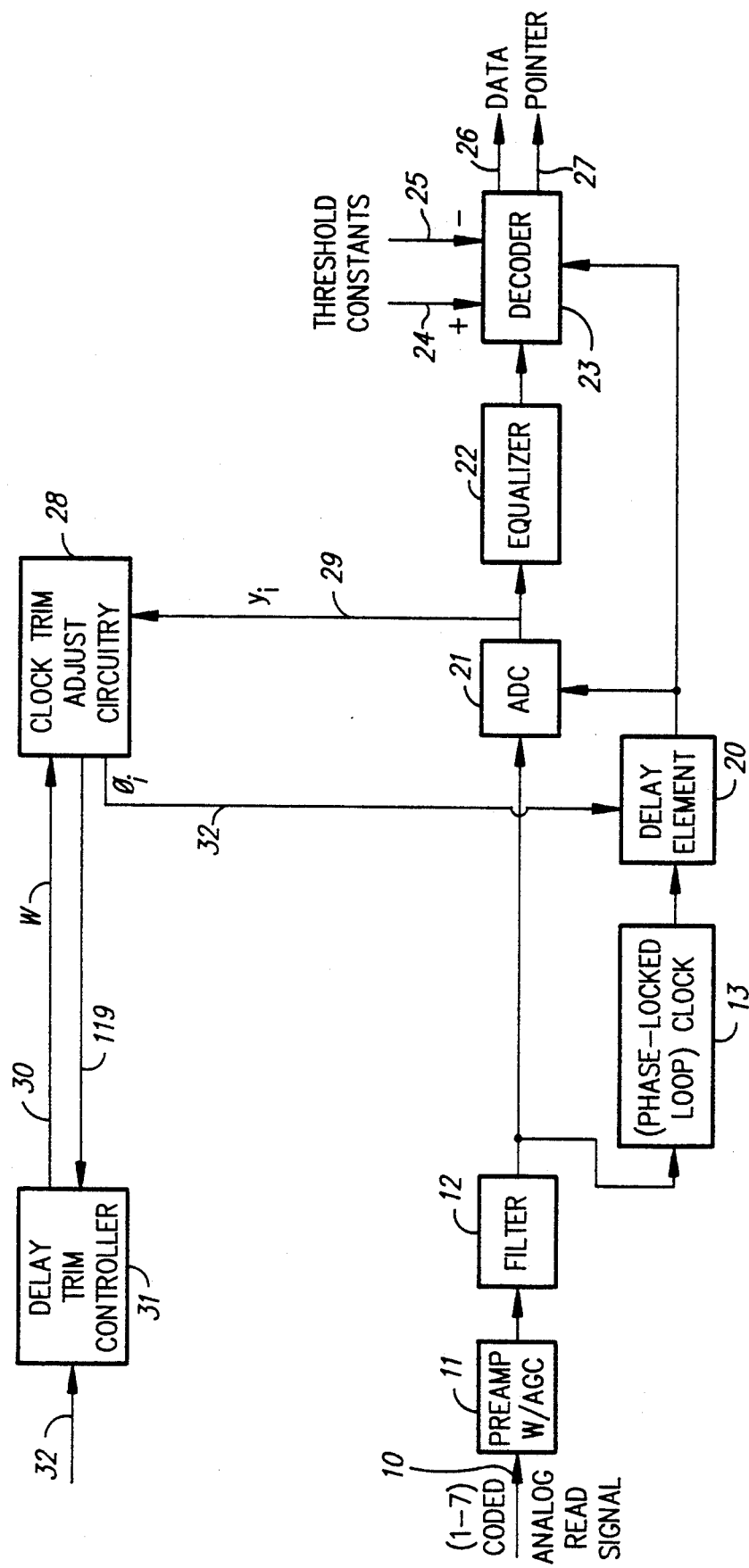
FIG. 1 is a schematic diagram of a coded digital signal processing channel modified in accordance with the invention to include clock delay trim adjustment circuitry.

As illustrated in FIG. 1, the signal processing channel embodying the invention includes a line 10 via which an analog read signal is fed from a transducer (not shown), such as a magnetic or optical read head in a digital data storage device or from a receiver in a data communication device. This read signal corresponds to a recorded (1,7) data sequence, which is a binary data sequence coded with a (1,7) run length limited (RLL) code during a write operation. The read signal passes from line 10 through a preamplifier 11 with automatic gain control (AGC) and a low bandpass filter 12. The output of filter 12 is supplied to a phase-locked clock 13 comprising a phase-locked loop timing recovery circuit including a variable frequency oscillator (VFO). The clock signal from clock 13 is to be used for sampling the analog read signal after the two signals are approximately synchronized.

The coded analog read signal output from filter 12 is supplied to an analog-to-digital convertor (ADC) 21. Delay element 20 may be a digital chip of the type which permits selectively adjustable delays in increments as low as a tenth of a nanosecond, depending upon the rate of the clock. A delay element 20 provides delay alignment between the analog signal and clock signal inputs to ADC 21. The equalizer 22 and control of the decoder 23 by threshold constants 24, 25 form no part of the present invention.

The apparatus thus far described is similar to that in the above-cited patent except that, in accordance with a preferred embodiment of the invention, clock delay trim adjustment circuitry 28 has been added and the clock signal (rather than the analog (read signal) is delayed. Circuitry 28 has as inputs line 29 coming from ADC 21 and a control line 30 from an external delay trim controller 31. Circuitry 28 has an output line 32 as a feedback input to delay element 20 and an output line 119 to delay trim controller 31. Input $Y_i$ to delay trim adjustment circuitry 28 is the digitized sample value produced by ADC 21 at the $i^{th}$ cycle and input W on line 30 is a binary value supplied by external trim controller 31.

Output $\phi_i$ of the delay trim adjustment circuitry 28 is supplied to element 20 and determines an upward or downward adjustment of the delay at the $i^{th}$ clock cycle. The delay element 20 has a sequence of possible settings, with each successive value being a small fixed time increments greater than the previous value. The delay trim adjustment values $\phi_i$ of $+1$ and $-1$ cause the delay to be increased and decreased, respectively, one unit (increment $\tau$).

External trim controller 31 sets W equal to 1 in order to invoke the delay trim function, and sets W equal to 0 to inhibit delay trim. External controller 31 is activated by a signal in line 32 to invoke delay trim. This would ordinarily be at start-up, when the delay setting of element 20 might be in an unknown state. It could also be during a retry procedure, or even during every read cycle, to compensate for any slow drift in the phase error after the initial trim operation. External trim controller 31 ensures that the device is reading from a data storage medium (not shown) a high frequency (1,7) data pattern,..., 0, 1, 0, 1, 0, 1,..., before delay trim is invoked, and terminates delay trim before this high frequency pattern stops.

A (1,7) maximum likelihood (ML) decoder, for example, decoder 23, performs best when the peaks of the analog signal from the preamplifier 11 with AGC are sampled at the peak values of the digitized samples.

Figure 2:
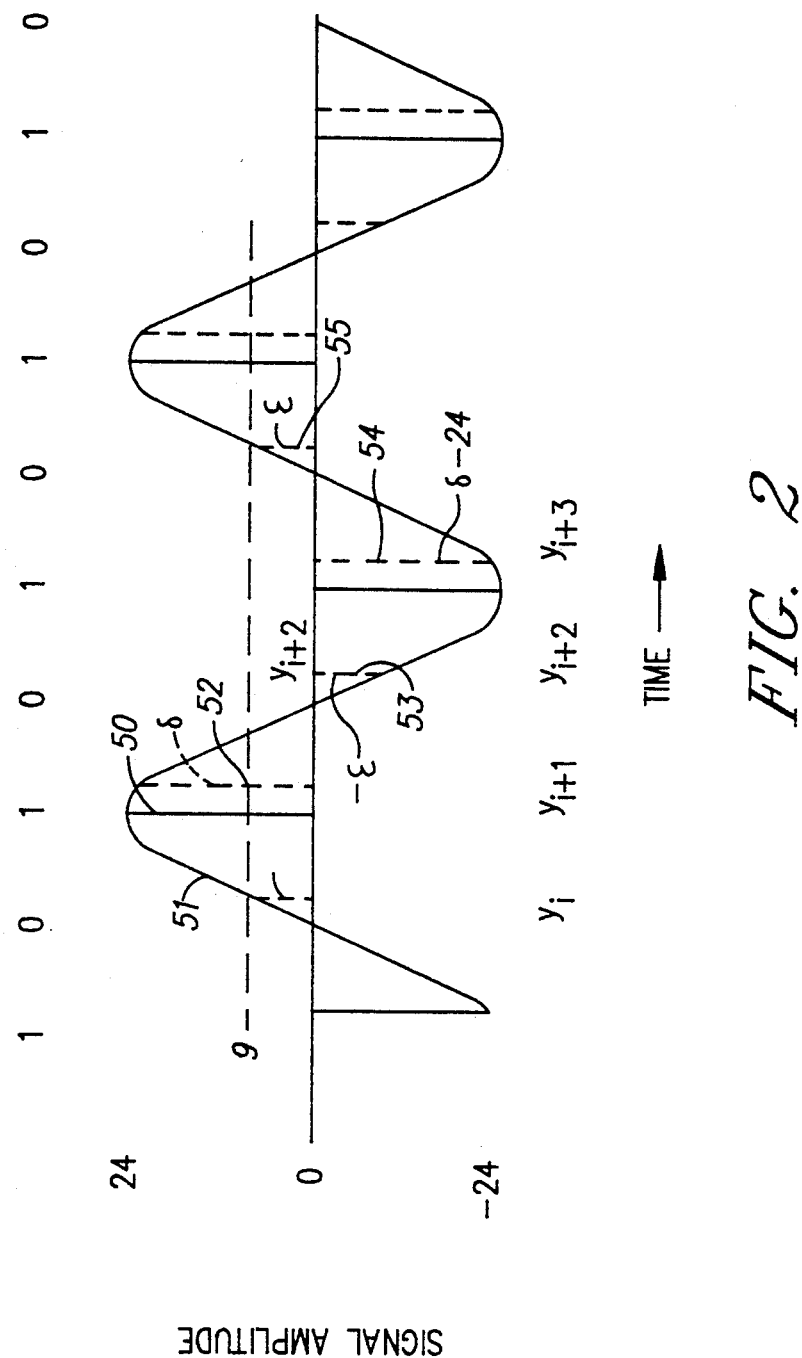
FIG. 2 shows a read waveform and digitized sample values of a high frequency (1,7) coded binary pattern when there is a fixed differential delay between the clock signal and analog signal.

FIG. 2 shows a high frequency (1,7) binary data pattern recorded in a special preamble area on the data storage medium (not shown). It depicts by the solid line 50 how the digitized sample value $y_i$ would look when the analog signal from delay element 20 is phase synchronized with the clock signal from clock 13, and provides an ideal read response of ...0, 24, 0, -24, 0, 24... The dash lines 51, 52, 53, 54, 55 depict how read response would be modified by a small phase error to ..$\epsilon$, 24 $-\delta$, $-\epsilon$, $\delta$ $-24$, $\epsilon$..., respectively, etc. where $\epsilon$ and $\delta$ are small. $\delta$ will be positive if the phase error is positive, and negative if the phase error is negative.

Overview

Figure 3:
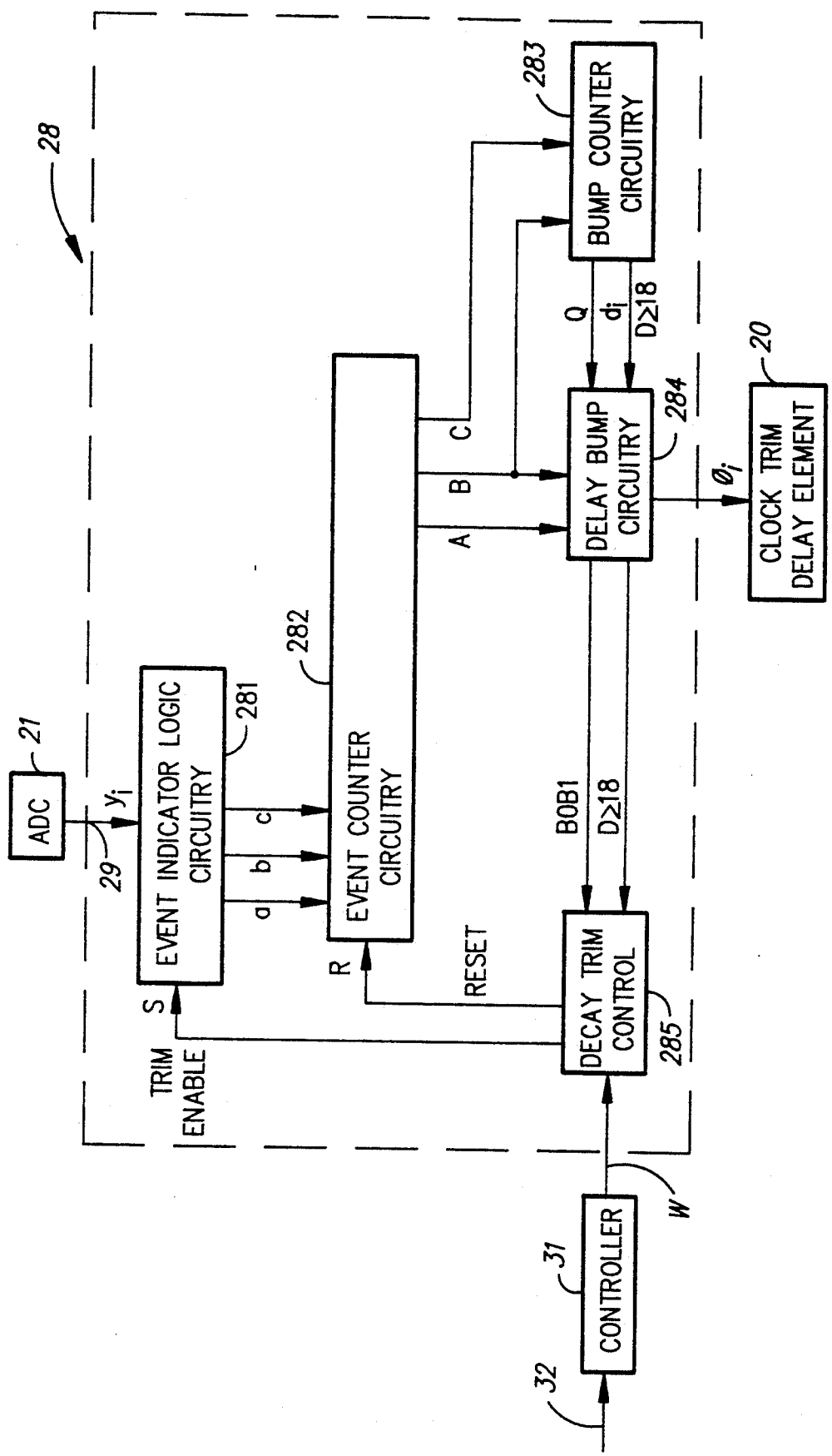
FIG. 3 is a block diagram showing the major components of the clock delay trim adjustment circuitry.

Referring now to FIG. 3, according to the invention, the delay trim adjustment circuitry 28 comprises event indicator logic circuitry 281, event counter circuitry 282, a bump counter 283, delay bump logic circuitry 284 and delay trim control logic circuitry 285. External controller 31 provides control signal W which is set to 1 to invoke the delay trim function through the trim-enable signal S.

Event indicator logic circuitry 281 is used to detect the presence and sign of an apparent phase error only when the delay trim function is enabled. The binary value of the trim-enable signal S, supplied by delay trim control circuitry 285, will be equal to 1 if the control gate from controller 31 is open with signal W=1 and also the previous delay adjustment is already settled (as indicated by "delay settle count" D $\geq$ 18 from delay bump circuitry 284). The outputs of circuitry 281 are the following:

a: Qualified event (positive pulse) indicator.
b: Phase error event indicator.
c: Extreme phase error event indicator.

Event counter circuitry 282 includes three counters A, B, and C which count the events coming from the event indicator logic circuitry 281. Counter A counts the number of qualified events (positive pulses) a, and counter C counts the number of extreme phase error events c. Counter B counts the cumulative phase error b, which is defined to be the sum of all the positive phase error events p, minus the sum of all the negative phase error events n.

Delay bump logic circuitry 284 provides the delay trimming values $\phi_i$ to delay element 20, and also sends inputs to the trim-control logic circuitry 285 which, in turn, provides the trim enable signal S to event indicator logic circuitry 281, and a binary reset variable R to event counter circuitry 282 to reset all three counters when R=1. Circuitry 284 also exchanges some variables with bump counter 283, which is used to count out three successive bumps in the same direction when an extreme phase error c is detected by counter C.

Table 1 summarizes the manner in which the clock delay trim adjustment circuitry 28 operates, through use of counters A, B, and C, to trim the delay setting of the delay element 20 to achieve phase synchronization between the clock signal and analog signal.

TABLE 1

| COUNTER B Accumulated phase error | COUNTER A A sample value is greater than K | COUNTER C Two adjacent samples are greater than K | Action to be taken | Purpose |
|---|---|---|---|---|
| N/A | N/A | C = T$_3$ | Bump up the delay 3 units if the sign of counter B is (+). Bump down 3 units if the sign is (−) or 0. Reset counters A, B and C to 0. | Initial anti-stuck |
| B = +T$_1$ | A $\leq$ N$_1$ | C < T$_3$ | Bump up the delay one unit and reset counter A, B, and C to 0. | Fast Converge |
| B = −T$_1$ | A $\leq$ N$_1$ | C < T$_3$ | Bump down the delay one unit and reset counters | |

TABLE 1-continued

| COUNTER B Accumulated phase error | COUNTER A A sample value is greater than K | COUNTER C Two adjacent samples are greater than K | Action to be taken | Purpose |
|---|---|---|---|---|
| $B = +T_2$ | $N_1 < A < N_2$ | $C < T_3$ | A, B, and C to 0. Bump up the delay one unit and reset counters | Slow Converge |
| $B = -T_2$ | $N_1 < A < N_2$ | $C < T_3$ | A, B and C to 0. Bump down the delay one unit and reset counters | |
| NA | $A \geq N_2$ | $C < T_3$ | A, B and C to 0. Stop delay trim | Stopping rule |

In a preferred embodiment and by way of illustration, $K=9$, $T_1=7$, $T_2=15$ and $T_3=7$, $N_1=15$, $N_2=48$, and NA=not applicable.

DETAILED DESCRIPTION—FIGS. 4A-C

Let $y_{i-1}$, $y_i$, $y_{i+1}$ denote six-bit digitized sample values from ADC 21 in three successive clock cycles, and K be a variable preselected as a suitable fractional part of the total amplitude of the analog pulse. The value of K is chosen so that corrections will not be made when defects in the storage medium cause the pulse amplitude to be very low and the phase error indicators to be unreliable. In the preferred embodiment, K is set at 9, based on a nominal pulse amplitude of 24.

The presence of a positive pulse at a qualified event a is indicated by the logical expression $(y_i>K) \cdot \Lambda(y_i>y_{i-1})\Lambda(y_i \geq y_{i+1})$ If there is a positive pulse at clock cycle i, then a positive phase error is indicated by $b=+1$ if $(y_{i-1}>y_{i+1})$, a negative phase error is indicated by $b=-1$ if $(y_{i-1}<y_{i+1})$ and a zero phase error is indicated by $b=0$ if $(y_{i-1}=y_{i+1})$. If two successive samples exceed the value of K, it indicates an extreme phase error event c on the order of one half the clock cycle.

Figure 4A:
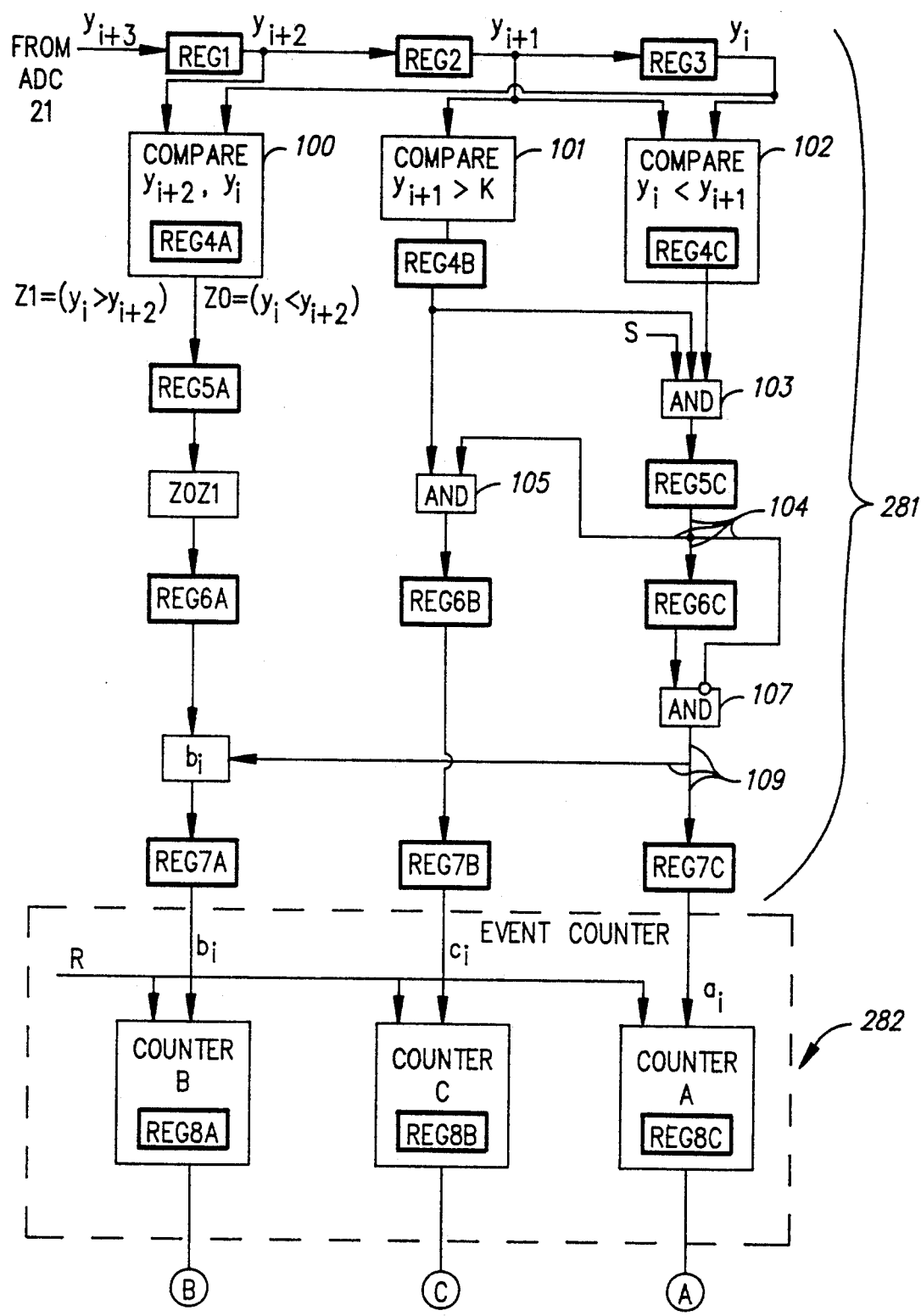
FIGS. 4A-C, when taken together, constitute a schematic diagram showing specific details of the pipelined data flow through various comparators, counters and registers to perform the delay trim function.

Table 2 shows how these events are computed from the digitized sample values $y_i$ and conditioned by the trim enable variable S. Note that indications of these events appear at the outputs a, b and c of the indicator circuitry 281 six cycles after the corresponding positive pulse is received from ADC 21, as a result of the delays in incrementing through the registers shown in FIG. 4A and labeled REG1 to REG7 to indicate cycle sequence.

TABLE 2

1. Indicator of Qualified Event
    $a_i = S(y_{i-6} > K)(y_{i-6} > y_{i-7})(y_{i-6} > y_{i-5})$
2. Indicator of
    Positive Phase Error
    $p_i = a_i(y_{i-7} > y_{i-5}) = 1$  implies  $b_i = +1$
    Negative Phase Error
    $n_i = a_i(y_{i-7} < y_{i-5}) = 1$  implies  $b_i = -1$
    Zero Phase Error
    $p_i = n_i = 0$  implies  $b_i = 0$
3. Indicator of Extreme Phase Error
    $c_i = S(y_{i-6} > K)(y_{i-5} > K)(y_{i-6} > y_{i-7})$ The equations given in Table 2 are implemented in the sequence indicated in detail in FIG. 4A, using the following logic. The digitized sample values are moved sequentially through registers REG1, REG2 and REG3. A comparator 100 compares $y_i$ with $y_{i+2}$ to determine if $y_i > y_{i+2}$ (denoted as $Z1=1$) or $y_i < y_{i+2}$ (denoted as $Z0=1$) and $y_{i+2}$ are two zero crossing samples adjacent to peak $y_{i+1}$.

The output of comparator 100 provides a signal Z0Z1 which is a preliminary error signal because it is based on only one pulse. Note that, as a convenience in implementation, negative pulses are treated as don't cares and only positive ones are considered in error signal generation. If Z0Z1=01, it preliminarily indicates an "up" adjustment and if Z0Z1=10 it indicates a "down" adjustment in the delay; but if Z0Z1=00, then do nothing.

A comparator 101 determines if a peak sample $y_{i+1}>K$. The value of a peak sample must be greater than K as above noted to avoid trimming the clock delay over defects with small amplitude.

A comparator 102 determines if $y_i < y_{i+1}$, as the peak sample $y_{i+1}$ must be greater than the previous sample $y_i$. The outputs of comparators 101 and 102 and the trim enable signal S are ANDed at 103, and will provide an output in line 104 provided clock delay trim enable signal S is on and the peak sample $y_{i+1}$ is greater than K as well as $y_i$.

The output from comparator 101 is again ANDed at 105 with the output in line 104 to indicate if two successive samples $y_i$ and $y_{i+1}$ are both greater than K. This indicates excessive phase error and will be used to trigger the C counter. When the count in counter C is $T_3$, the delay setting will be bumped up or down three times depending on the sign of the count in counter B.

An event is defined as a pulse which consists of a peak sample ($y_{i+1}$) and two zero crossing samples $y_i$ and $y_{i+2}$. An event is hereinafter defined as a qualified event (which triggers counter A) if the value of the zero crossing $y_{i+2}$, which follows the peak sample $y_{i+1}$, was not considered as another peak by AND gate 103; i.e., did not produce an output on line 104. This is condition detected by the AND gate 107 with an inverted input from line 104 and another delayed input from REG 6C which is interposed between line 104 and AND gate 107 to delay the output from REG 5C by one pulse. Thus line 109 indicates a qualified event and will be used to trigger counter A. It is also used to condition Z0Z1 to provide a preliminary error signal $b_i$ which is based on a qualified event and is accumulated in counter B. This error signal will be positive, negative or zero depending upon the value of Z0Z1 for a qualified event and it will be zero for an unqualified event.

Counter A counts qualified events. From the preceding description it will be apparent that, according to the selected implementation, a qualified event is a digitized sample value with a positive peak having a magnitude exceeding the predetermined value K and not smaller than the magnitudes of both the immediately preceding and immediately following samples in the high frequency pattern. Counter A preferably counts from 0 to 55. All counters are reset whenever a delay trim adjustment is made. When the count in counter A is not reset before reaching value $N_2$, the delay setting is deemed to be correct, and delay trim adjustment is stopped. In the preferred embodiment, $N_2$ is equal to 48.

Counter B generates a count cumulatively indicating the difference between the number of phase error events with positive direction and the number with negative direction by means of the current sign and weight of phase error events. It accumulates the preliminary delay error signals $b_i$ and provides the bump direction and trigger for a change in the delay setting. The value of the error signal which is based on one event is $+1$, $-1$, or 0. A $+1$ indicates the clock needs more delay with respect to the analog signal. A $-1$ indicates the clock needs less delay. A 0 indicates no action. The sign of the contents of counter B specifies the bump direction. Stated differently, (+), (-), and (0) indicate "bump up", "bump down", and "no bump", respectively. The starting count is 0. Counter B has two threshold values, a primary value $T_1$ and a greater value $T_2$. If the count in counter B reaches $T_2$, or if it reaches $T_1$ before the count in counter A exceeds $N_1$, then the delay setting will be moved up by one unit. Conversely, if the count in counter B reaches $-T_2$, or if it reaches $-T_1$ before that in counter A exceeds $N_1$, then the delay setting will be moved down by one unit. In the preferred embodiment, counter B has a range of $-T_2$ to $T_2$; and $T_1=7$, $T_2=15$, and $N_1=15$.

Counter C counts the number of events in each of which two successive samples have sample values greater than K. This condition, as denoted by the expression for indicator c, represents an extreme phase error event. Counter C is used to get out from a frozen delay trim state which may happen when synchronization is close to 90° out of phase. In such a case, the phase error estimate could indicate positive or negative, and noisy samples could cause the delay setting to wobble or hunt and not converge to a correct value. Counter C counts from 0 to $T_3$. If the count in counter C reaches threshold $T_3$, the delay setting will be moved up or down by three units, depending on whether the sign of the count in counter B is positive or negative, respectively. In the preferred embodiment, $T_3=7$.

Table 3 shows the logic implemented by each counter A, B and C, of the event counter logic circuitry 282. When R (reset all counters) is 1, counters A, B and C are reset to 0 value.

TABLE 3

1. Qualified Event Counter A $$A_{i+1} = \begin{cases} A_i + a_i & \text{if } R = 0 \\ 0 & \text{if } R = 1 \end{cases}$$

2. Accumulated Phase Error Counter B $$B_{i+1} = \begin{cases} B_i + b_i & \text{if } R = 0 \\ 0 & \text{if } R = 1 \end{cases}$$

3. Extreme Phase Error Counter C.

TABLE 3-continued $$C_{i+1} = \begin{cases} C_i + c_i & \text{if } R = 0 \\ 0 & \text{if } R = 1 \end{cases}$$

Table 4 shows the equations implemented by the bump counter 113a and bump direction set 113b of circuitry 283 to correct an excessive phase error.

TABLE 4

Bump Counter Output Q $$Q_i = \begin{cases} Q_{i-1} + 1 & \text{if } (C = 7) + (0 < Q_{i-1} < 3) \, (D \geq 18) \\ 0 & \text{if } (Q_{i-1} = 3) \, (D_i \geq 18) \\ Q_{i-1} & \text{otherwise} \end{cases}$$

Bump Direction Set Output =
$$d_i = (Q_i = 1)(B > 0) + (Q_i > 1) \, d_{i-1}$$

If counter C exceeds its threshold $T_3$ (assumed as 7) due to an extreme phase error, then the Q count supplied by bump counter 113a will force the same bump direction three consecutive times to change the delay setting in the same direction to speed up the convergence. The bump direction is determined in 113b by the sign (positive or negative) of the count in counter b and set by the variable d which holds its values for $Q=1, 2$, and 3. There is an interval (such as 18 cycles) controlled by the count in the delay settle counter 117 between each bump to sufficiently allow the recently bumped clock to settle before it is bumped again, to avoid a possible glitch in the clock.

When the phase error is not extreme, bumps are controlled by Counters A and B. Counter B contains the cumulative phase error. A bump will be invoked if the counter B reaches one of its high thresholds $T_2$ or $-T_2$ (assumed as $+/-15$), or if it reaches one of its low thresholds $T_1$ or $-T_1$ (assumed as $+/-7$) before counter A exceeds $N_1$ (assumed as 15). When the phase error is moderately large, counter B will tend to increase (or decrease) quickly, and the low threshold will insure that the bump decision is made quickly. As the phase error becomes smaller after a succession of bumps, counter B will increase (or decrease) more slowly, but will eventually reach the high threshold, and cause a bump. The second (higher) threshold $T_2$ or $-T_2$ is provided to avoid the possibility of a bump in the wrong direction when the phase error is near zero.

When successive bumps have eliminated the phase error, delay trim is terminated. If this were not done, counter B, may eventually reach its high threshold and invoke a bump action due to random noise in the sample values $y_i$. according to a feature of the invention, delay trim is stopped if counter A reaches the $N_2$ count of 48, as reflected in the delay trim inhibit variable I, shown later in Table 6.

Figure 4B:
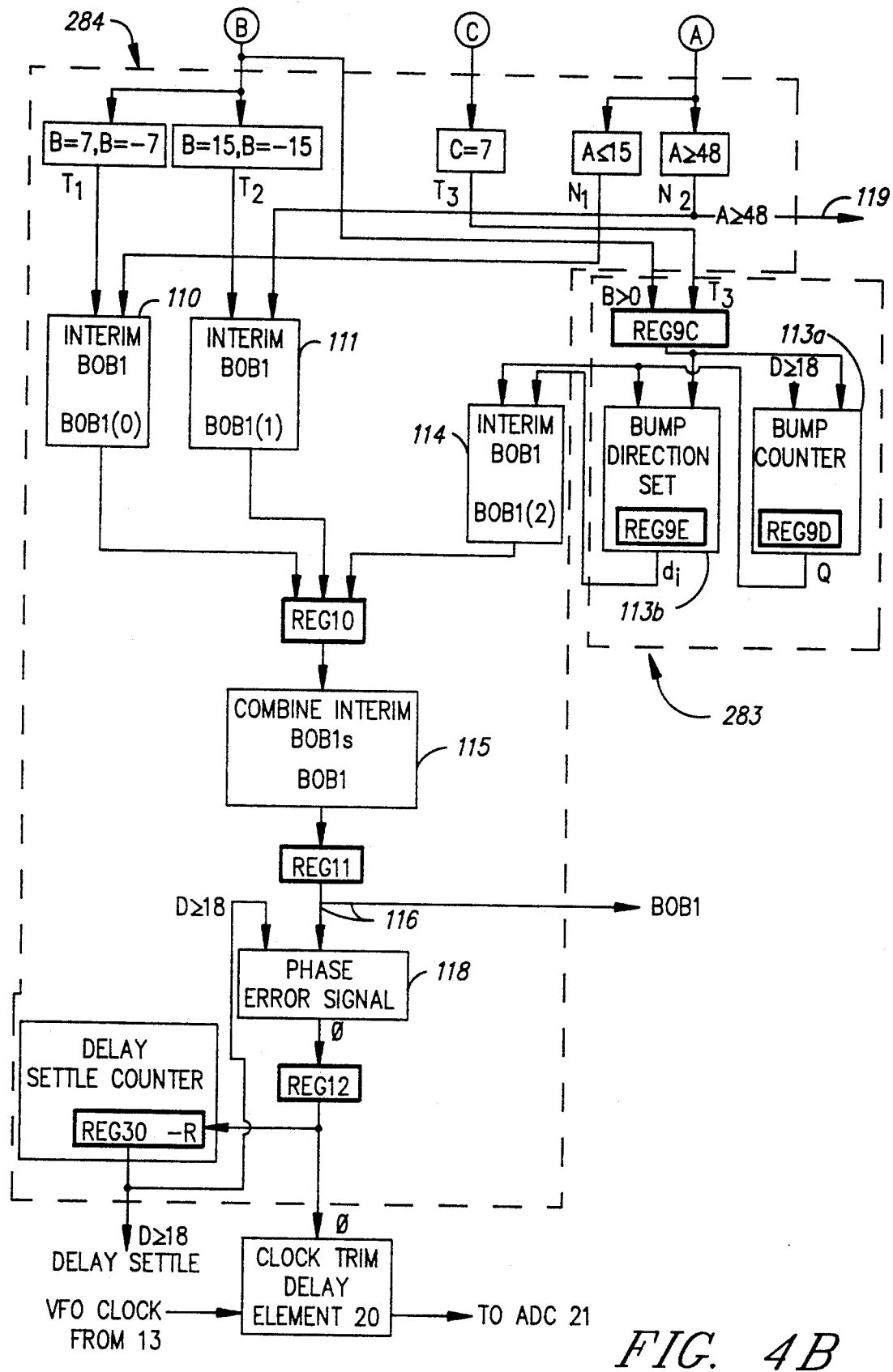
Figure 4C:
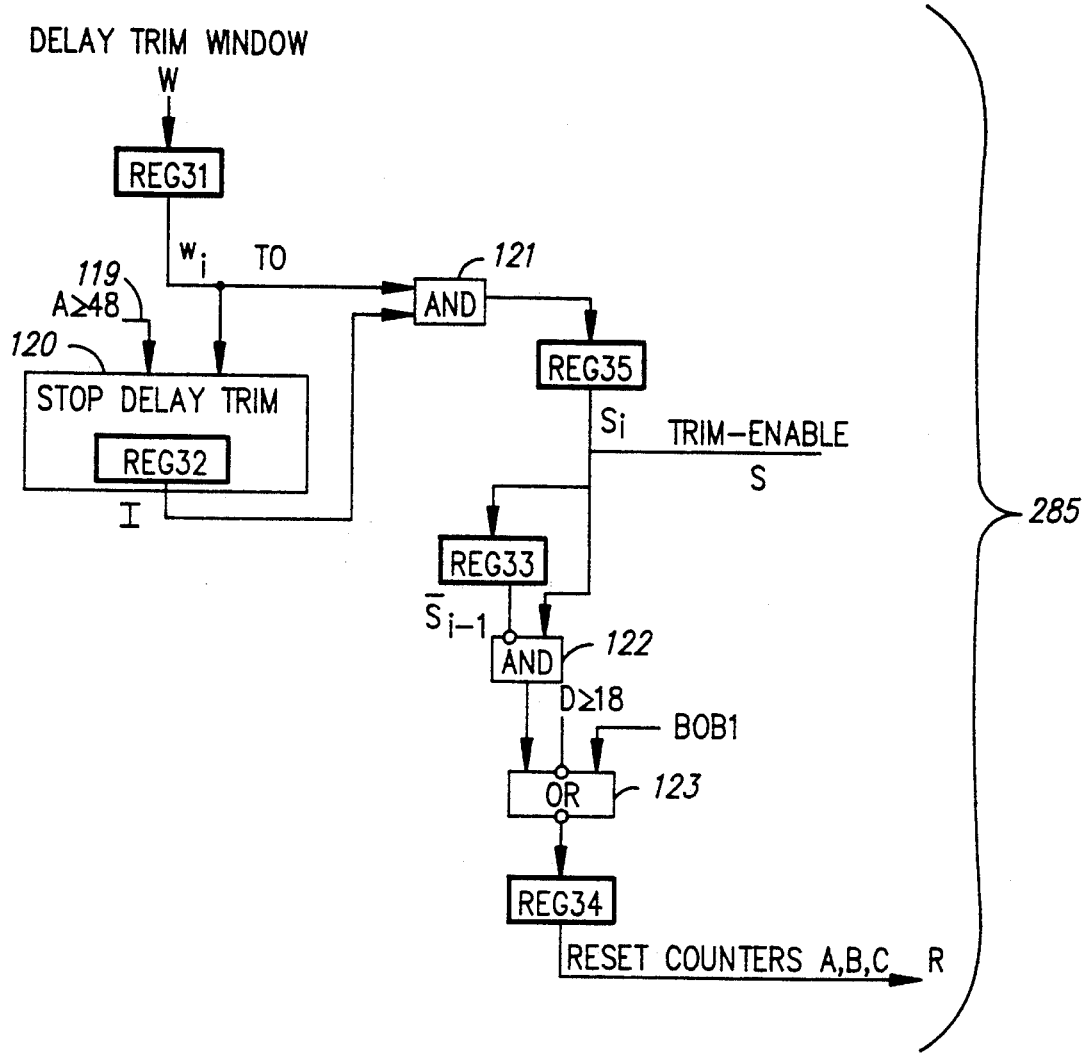

Table 5 shows the logic which is implemented by the bump decision logic circuitry 284 shown in FIG. 4B.

TABLE 5

Interim Bump Indicator B0B1:
B1 indicates bump "up"; B0 indicates bump "down"
B1(0) = (B = 7)   (A ≦ 15)
B0(0) = (B = −7)  (A ≦ 15)
B1(1) = (B = 15)  ($\overline{A \geq 48}$)
B0(1) = (B = −15) ($\overline{A \geq 48}$)
B1(2) = ($Q_i > 0$)d TABLE 5-continued B0(2) = (Q_i > 0)$\bar{d}$ Combine Interim B0B1 (Bump Indicator)

B1 = B1(2) + $\overline{B1(2)}$ B1(1) + $\overline{B1(2)}$ B1(0)

B0 = B0(2) + $\overline{B0(2)}$ B0(1) + $\overline{B0(2)}$ B0(0).

Phase Error Signal $$\phi = \begin{cases} +1 & \text{if (B1 = 1) and (D} \geq 18) \\ -1 & \text{if (B0 = 1) and (D} \geq 18) \\ 0 & \text{otherwise} \end{cases}$$

Delay Settle Counter Output D.

$$D_i = \begin{cases} 0 & \text{if } \phi \neq 0 \\ D_{i-1} + 1 & \text{if } (\phi = 0) \text{ and (D} < 18) \\ D_i & \text{if } (\phi = 0) \text{ and (D} \geq 18) \end{cases}$$

Preliminary error signal B0B1 is developed in the following manner using the logic of Table 5. R0B1(0) is activated at 110 by inputs from counters A and B. Its value becomes 01 or 10 when the count in counter B becomes +7 or −7 respectively, and that in counter A ≦ 15. Similarly, B0B1(1) is activated at 111. Its value becomes 01 or 10 when the count in counter B becomes +15 or −15, respectively, but is disabled to 00 by the inverted input from counter A when A ≧ 48. B0B1(2) is activated at 114 by inputs from 283. Its value becomes 01 or 10 when the bump direction variable d from 113b is 1 or 0, respectively, and the count Q of the bump counter 113a is greater than 0 (i.e., Q=1, 2 or 3). Note that d=1 indicates "bump up" and d=0 indicates "bump down".

The three preliminary phase error signals, B0B1(0), B0B1(1), B0B1(2), are combined at 115, with B0B1(2) having the highest priority. A phase error signal B0B1 is generated in line 116. A delay settle counter 117 provides a signal that holds the delay correction immediately after a correction is performed until the circuit is settled with the new delayed clock and ready for another correction. The phase error signal B0B1 is gated by the delay settle signal (D ≧ 18) from 117 to generate the phase error signal $\phi$ at 118. The phase error signal $\phi$ is +1 for bump up when B0B1=01; is −1 for bump down when B0B1=10; and 00 for no action when B0B1=00. The delay settle counter 117 is reset (to D=0) whenever a bump action is invoked by $\phi \neq 0$, as indicated in Table 5.

Table 6 shows the control function implemented by the delay trim control circuitry 285.

TABLE 6

| Control Functions |
| --- |
| Stop Delay Trim |
| $I_{i+1} = I_i w_i + w_i (A_i \geq 48)$ |
| Trim Enable |
| $S_i = W_i \bar{I}_i$ |
| Reset Counters A, B and C |
| $R_{i+1} = S_i \bar{S}_{i-1} + \overline{(D \geq 18)} + B0 + B1$ |

When successive bumps have eliminated the phase error, delay trim is terminated by the inhibit signal I from the stop delay trim circuit 120 in circuitry 285. The inhibit variable I is normally down but is inverted at AND gate 121 so that when the delay trim window is open (i.e., $w_i$ is up), the AND gate 121 will pass the trim-enable signal S. When the count in counter A ≧ 48, the output provided in line 119 will be ANDed with window signal $w_i$ and the inhibit variable I will come up (i.e., = 1) and remain up. This will cause a continuous up input to be provided by $I_i$ at 121 and the trim-enable signal S will go down and inhibit further trim adjustment.

A change in trim-enable signal S from down to up (i.e., $S_{i-1}=0$ to $S_i=1$) starts the trim process by first resetting the counters A, B and C. As soon as trim enable signal $S_i$ becomes different from the delayed $S_{i-1}$ from REG 33, the signals $S_i$ and $\bar{S}_{i-1}$ will be ANDed at gate 122 and, via OR gate 123, condition REG 34 to generate signal R for resetting counters A, B and C.

Counter reset signal R will also be generated when a phase error signal input B0B1 from 118 is supplied via OR gate 123 to REG 34 and/or while the delay settle counter 117 output D ≧ 18 is down (due to its inversion at OR gate 123).

While the invention has been described with respect to a preferred embodiment thereof, it will be understood that various changes may be made in the method and circuitry herein described without departing from the scope and teaching of the invention. Accordingly, the embodiment illustrated is to be considered merely illustrative and the invention is not to be limited except as specified in the claims:

We claim:

1. A method of phase synchronizing an analog input signal with a clock signal, comprising the steps of:
    providing a delay element initially having an arbitrary delay setting;
    converting the analog signal into a series of digitized samples at successive clock signals;
    comparing the relative values of three successive samples for determining whether the value of the second sample qualifies as a peak;
    comparing the relative values of the first sample and third sample for generating an error signal denoting positive or negative direction of a phase error event; and
    responsive to said error signal, adjusting the delay setting toward a correct setting for correspondingly adjusting the phase differential of the clock and analog input signal toward synchronization.

2. The method of claim 1, wherein a sample qualifies as a peak when its magnitude exceeds a predetermined value and is not smaller than the magnitude of both immediately preceding and immediately following samples.

3. A method of phase synchronizing an analog input signal with a clock signal, comprising the steps of:
    (a) at successive clock signals, converting the analog signal into a series of digitized samples which may be subject to noise;
    (b) counting with a first counter (A) qualified events identified by a sample having a magnitude exceeding a predetermined value K and not smaller than the magnitudes of both the immediately preceding and immediately following samples;
    (c) from a sequence of qualified events, generating with second counter (B) a count of phase error events with positive direction and those with negative direction and cumulatively indicating numerical difference therebetween by a current sign and weight of the phase error events; and (d) adjusting the phase a preselected amount in a direction controlled by said current signal when the count in the second counter reaches preselected limits.

4. The method of claim 3, including following step (d), the steps of:
resetting said counters to zero; and
returning to steps (b), (c) and (d).

5. The method of claim 3, including the step of:
(e) terminating adjustment of phase during step (b), (c) or (d) if the first counter counts a predetermined number ($N_2$) of qualified events.

6. The method of claim 5, including the steps of:
(f) with a third counter (C), counting how often two adjacent samples exceed said predetermined value;
(g) adjusting the phase a preselected greater amount in a direction controlled by said current sign indicated by said second counter irrespective of the count in said second counter whenever the count of the third counter exceeds a predetermined threshold ($T_3$); and
(h) following steps (d) or (g), resetting said first, second and third counters, and returning to steps (b) (c) and (d).

7. The method of claim 3, including in step (d) the step of:
adjusting the phase said preselected amount in the direction controlled by said current sign when the count in the second counter reaches (i) either of two limits of a predetermined smaller range ($T_1$ to $-T_1$) symmetrically contained within a predetermined larger range ($T_2$ to $-T_2$) before the count in said first count exceeds a predetermined number ($N_1$).

8. Circuitry for phase synchronizing an analog input signal with a clock signal, comprising:
a delay element initially having an arbitrary delay setting;
means for converting the analog signal into a series of digitized samples at successive clock signals;
means for comparing the relative values of three successive samples for determining whether the value of the second sample qualifies as a peak;
means for comparing the relative values of the first sample and third sample for generating an error signal denoting positive or negative direction of a phase error event; and
means responsive to said error signal for adjusting the delay setting toward a correct setting for correspondingly adjusting the phase differential of the clock and analog input signal toward synchronization.

9. The circuitry of claim 8, wherein a sample qualifies as a peak when its magnitude exceeds a predetermined value and is not smaller than the magnitudes of both immediately preceding and immediately following samples.

10. Circuitry for phase synchronizing an analog input signal with a clock signal, comprising: p1 an analog-to-digital converter for converting, at successive clock signals, the analog signal into a series of digitized samples which may be subject to noise;
a first counter (A) for counting qualified events identified by a sample having a magnitude exceeding a predetermined value K and not smaller than the magnitudes of both the immediately preceding and immediately following samples;
a second counter (B) for generating, from a sequence of qualified events, a count of phase error events with positive direction and those with negative direction and cumulatively indicating numerical difference therebetween by a current signal and weight of the phase error events; and
means responsive to the count in the second counter reaching preselected limits for adjusting the phase a preselected amount in a direction controlled by said current sign.

11. The circuitry of claim 10, including means operative when the count in said second counter reaches one of said preselected limits for resetting said counters to zero.

12. The circuitry of claim 10, including means responsive to the first counter counting a predetermined number ($N_2$) of qualified events for disabling said adjusting means.

13. Circuitry for phase synchronizing an analog input signal with a clock signal comprising:
a delay element initially having an arbitrary delay setting;
an analog-to-digital converter (ADC) responsive to successive clock signals for converting the analog signal into a series of digitized samples subject to noise; and
clock delay trim adjustment circuitry connected to the output of the ADC and providing an input to the delay element, said adjustment circuitry comprising:
(a) a first counter (A) for qualified events identified by a sample having a magnitude exceeding a predetermined value (K) and not smaller than the magnitudes of both the immediately preceding and immediately following samples;
(b) a second counter (B) for generating from a series of qualified events a count of phase error events with positive direction and those with negative direction and cumulatively indicating numerical difference therebetween by a current sign and weight of phase error events;
(c) a third counter (C) for counting how often two adjacent samples have a magnitude exceeding the predetermined value (K);
(d) first means for bumping a delay setting up or down a preselected amount when the count in the second counter reaches a preestablished threshold value (e.g., $T_1$ or $-T_1$) before the count in the first counter exceeds a preestablished number (e.g., $N_1$); and
(e) second means operative, whenever the count in the third counter reaches a preselected threshold ($T_3$), for bumping the delay setting a preselected greater amount up or down depending upon the sign of the count in the second counter for insuring against hunting.

14. The circuitry of claim 13, including means for terminating adjustment of the delay setting when the count in said first counter reaches a preselected number ($N_2$).

15. The circuitry of claim 13, including means for resetting said counters whenever the count in said second counter reaches the preestablished threshold value.

16. The circuitry of claim 15, including a delay settle counter which counts clock cycles for delaying operations of said resetting means for a predetermined number of clock cycles after each bumping operation of said first means or second means.

17. The circuitry of claim 13, wherein the second counter has four preestablished threshold values $T_1$, $-T_1$, $T_2$, and $-T_2$, the values $T_1$ being smaller than that of $T_2$ and wherein said first bumping means bumps the delay setting up or down the preselected amount when the count in the second counter reaches either (i) $+T_1$ or $-T_1$ respectively, before the count in the first counter exceeds $N_1$, or (ii) $+T_2$ or $-T_2$ respectively, after $N_1$ is reached, but before a preestablished larger number $N_2$ is reached at which the delay setting is presumed correct.

18. The circuitry of claim 13, including a controller for enabling the clock delay trim adjustment circuitry only for a preselected number of cycles of a run length limited high frequency data pattern read from a data storage medium during a preselected period of operation for estimating phase error over a preselected number of sample values deemed sufficient to eliminate noise effect, and disabling the trim adjustment circuitry when trim adjustment is completed.

* * * * *

UNITED STATES PATENT AND TRADEMARK OFFICE
CERTIFICATE OF CORRECTION

PATENT NO. : 5,266,850

DATED : Nov. 30, 1993

INVENTOR(S) : H. A. Au et al.

It is certified that error appears in the above-identified patent and that said Letters Patent is hereby corrected as shown below:

Column 4, line 1, delete "$\delta$", insert --$\varepsilon$--.

Column 6, line 17, after "denoted as ZO=1)", insert --where $y_i$--.

Column 8, line 54, before "according", insert --Therefore--.

Column 11, line 2, delete "signal", insert --sign--.

Column 11, line 35, after "($N_1$)", insert --, or (ii) either limit of said larger range if the count in said first counter exceeds said predetermined number ($N_1$) but is less than a predetermined larger number ($N_2$).--.

Column 11, line 60, delete "pl".

Signed and Sealed this

Nineteenth Day of July, 1994

Attest:

BRUCE LEHMAN

Attesting Officer

Commissioner of Patents and Trademarks